US012361973B2

(12) United States Patent
Wu et al.

(10) Patent No.: US 12,361,973 B2
(45) Date of Patent: Jul. 15, 2025

(54) SEAMLESS INSERTION OF MODIFIED MEDIA CONTENT

(71) Applicant: Amazon Technologies, Inc., Seattle, WA (US)

(72) Inventors: Yongjun Wu, Bellevue, WA (US); Hyo In James Moon, Bothell, WA (US); Abhishek Kumar, Bothell, WA (US); Ahmed Aly Saad Ahmed, Bothell, WA (US); Sitaraman Ganapathy, Issaquah, WA (US); Steven James Cox, Mill Creek, WA (US); Yash Chaturvedi, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/937,163

(22) Filed: Sep. 30, 2022

(65) Prior Publication Data

US 2024/0112703 A1 Apr. 4, 2024

(51) Int. Cl.
*G11B 27/036* (2006.01)
*H04N 21/234* (2011.01)

(52) U.S. Cl.
CPC ..... *G11B 27/036* (2013.01); *H04N 21/23424* (2013.01)

(58) Field of Classification Search
None
See application file for complete search history.

(56) References Cited

U.S. PATENT DOCUMENTS

| 6,584,273 B1* | 6/2003 | Ashley | G11B 27/105 386/346 |
| 10,972,809 B1* | 4/2021 | Key | H04N 21/23439 |
| 11,589,116 B1* | 2/2023 | Omar | G06V 20/44 |
| 2014/0237521 A1 | 8/2014 | Rothschild et al. | |
| 2018/0167698 A1* | 6/2018 | Mercer | G11B 27/031 |
| 2018/0330756 A1* | 11/2018 | MacDonald | G06F 16/951 |
| 2019/0069004 A1 | 2/2019 | Badawiyeh | |
| 2019/0075148 A1 | 3/2019 | Nielsen et al. | |
| 2019/0313135 A1* | 10/2019 | Pathak | H04N 21/8586 |
| 2020/0053394 A1* | 2/2020 | Shiraishi | H04L 65/612 |
| 2022/0156317 A1* | 5/2022 | Adato | G06V 40/20 |
| 2022/0180898 A1 | 6/2022 | Ahmed et al. | |

OTHER PUBLICATIONS

International Search Report and Written Opinion for PCT/US23/75128 mailed Jan. 22, 2024.

* cited by examiner

*Primary Examiner* — Daniel T Tekle
(74) *Attorney, Agent, or Firm* — Perilla Knox & Hildebrandt LLP; Thomas B. Hildebrandt (57) ABSTRACT

Disclosed are various embodiments for seamless insertion of modified media content. In one embodiment, a modified portion of video content is received. The modified portion has a start cue point and an end cue point that are set relative to a modification to the video content to indicate respectively when the modification approximately begins and ends compared to the video content. A video coding associated with the video content is identified. The start cue point and/or the end cue point are dynamically adjusted to align the modified portion with the video content based at least in part on the video coding.

20 Claims, 7 Drawing Sheets

SEAMLESS INSERTION OF MODIFIED MEDIA CONTENT

BACKGROUND

Digital video comprises a sequence of individual video frames that are played back at a frame rate, such as 24 frames per second (fps), 30 fps, 60 fps, and so on. Maintaining each video frame as a separate image comprising a two-dimensional raster of pixels would lead to enormous file sizes and extreme bandwidth requirements for streaming. Consequently, a number of different video coding technologies are in use, such as H.264 and High Efficiency Video Coding (HEVC), to compress the data size of the video frames. Although image compression techniques could be used to compress each video frame separately, it is recognized that there are often rather minimal changes between adjacent frames. Thus, for maximum efficiency, video coding typically includes dependencies on adjacent frames to provide inter-frame compression.

Modern video coding techniques generate compressed video frames that are I-frames, P-frames, or B-frames. I-frames, or key frames, are compressed such that they do not depend on any other video frame. By contrast, P-frames and B-frames include dependencies on other video frames. P-frames are compressed to allow dependencies on a previous video frame in the sequence, and B-frames are compressed to allow dependencies on both a previous video frame and a next video frame in the sequence. A group of pictures refers to a segment of a sequence of video frames that contains an I-frame followed by any number of P-frames and/or B-frames.

Digital video is usually matched with a corresponding audio track that is played back along with the video. The audio track may include multiple audio channels (e.g., stereo or surround sound). In some cases, alternative audio tracks corresponding to commentaries or other languages may be available. Audio tracks comprise a sequence of audio samples, which are sampled at a sample rate, such as 44,100 Hertz (Hz), 48,000 Hz, 96,000 Hz, and so on. Like digital video, digital audio tracks are typically compressed. For example, audio compression methods include Moving Picture Experts Group (MPEG)-1 Audio Layer 3 (MP3), Advanced Audio Coding (AAC), and so on. Compression of audio tracks generate compressed audio frames that include a number of samples, such as 1024 samples, potentially encoding multiple audio tracks for the same time period.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to seamless insertion of modified media content in media streams. Video-on-demand (VoD) services may insert advertising, promotional announcements, or public service announcements into video content. Unlike with broadcast video content that includes a fixed selection of advertisements for a general audience, VoD services may insert advertising or other announcements that are customized for the particular viewer. For example, the advertising or other announcements may be selected based on which other advertisements or announcements have been presented previously to the viewer (e.g., to avoid repeats), what other content the viewer has seen (e.g., promotions for content already seen can be avoided, and promotions that are relevant to previously viewed content may be selected), inferred or explicit preferences of the viewer, demographic information associated with the viewer, and so on.

Conventional advertising is inserted at scene changes or other designated breaks in the video content. The conventional advertising may have a completely different presentation than the video content in terms of sight and sound. Viewers are accustomed to the jarring effect of the change from the video content to the advertising content. The conventional advertising may have lengths of standardized durations, such as five second, fifteen second, thirty seconds, sixty seconds, and so on.

In some cases, the video content may include embedded advertising in the form of product placement. Real-world brands of different items (e.g., candy, soft drinks, automobile models, recognizable consumer goods, etc.) may be intentionally incorporated into the video content when the video content is created. Sounds and dialogue may also incorporate product placement references. Product placement has the advantage of being comparatively unobtrusive as compared to conventional commercial interruptions. As a downside, like broadcast advertising, product placement is generally fixed and is not customized for individual viewers.

A form of advertising adapted for VoD services is virtual product placement. With virtual product placement, a number of alternative products may be incorporated into video content in post-production, thereby producing a number of modified versions of the video content. For example, a conference room table shown in video content may be alternatively modified to show a dish of branded candy in one instance, a branded soft drink in another instance, or a branded electronic device in yet another instance. This modification may take the form of editing the video to superimpose the product, editing the audio to include a dialogue reference to the product (e.g., a branded wake word for a voice interface device), and so on. In some cases, a number of different versions of video content with product placements may be created manually by recording alternative scenes. A particular version incorporating product placement may be selected based on one or more characteristics of the viewer. A goal may be for the insertion of product placement content not to disrupt the video content.

Complete alternative versions of video content, such as movies and television programs, for multiple alternative product placements may be cost prohibitive in terms of data storage and bandwidth consumption associated with propagating them on a content delivery network. Perhaps only a brief portion of a scene (e.g., a portion of a scene depicting a clear view of the conference room table) is modified to embed the virtual product placement.

One approach would be simply to insert the brief modified portion of a scene when streaming or playing the video content. However, the modified portion of the scene may not be perfectly aligned in terms of video with the group of pictures boundaries, or audio in terms of audio frame boundaries. Consequently, switching to or from the modified portion of the video content may cause perceptible glitching in the video or audio, particularly with music or sounds that have a consistent tone. While glitching may be unnoticed during the context switch of transitioning to and from conventional advertising interruptions, any glitch associated with virtual product placement insertion may be deemed unacceptable and incongruent with the goal of seamless insertion.

Various embodiments of the present disclosure introduce a seamless insertion of modified media content, such as virtual product placement content, so that the insertion of the modified media content is not affected by any perceptible glitches caused by video or audio alignment. In a first set of embodiments, the length of the modified content is dynamically determined, based upon video and audio coding characteristics, so as to align the video frame boundaries and audio frame boundaries. This can involve switching to the modified video content at an earlier time, or switching back to the original video content at a later time, than would otherwise correspond to the video content that is actually modified (e.g., to embed the virtual product placement). In a second set of embodiments, a streaming protocol configures video players to handle audio and video media timelines that include switches to or from modified media content contiguously and seamlessly without dropping audio or video frames and/or gaps.

As one skilled in the art will appreciate in light of this disclosure, certain embodiments may be capable of achieving certain advantages, including some or all of the following: (1) reducing data storage and network bandwidth requirements for a content delivery network in storing multiple alternative complete versions of media content; (2) avoiding undesirable audio or video glitching associated with switching to or from a modified portion of media content; (3) improving the media consumer experience by avoiding noticeable context switches in media content that include disruptive changes in audio amplitude or video output; and so forth.

Figure 1A:
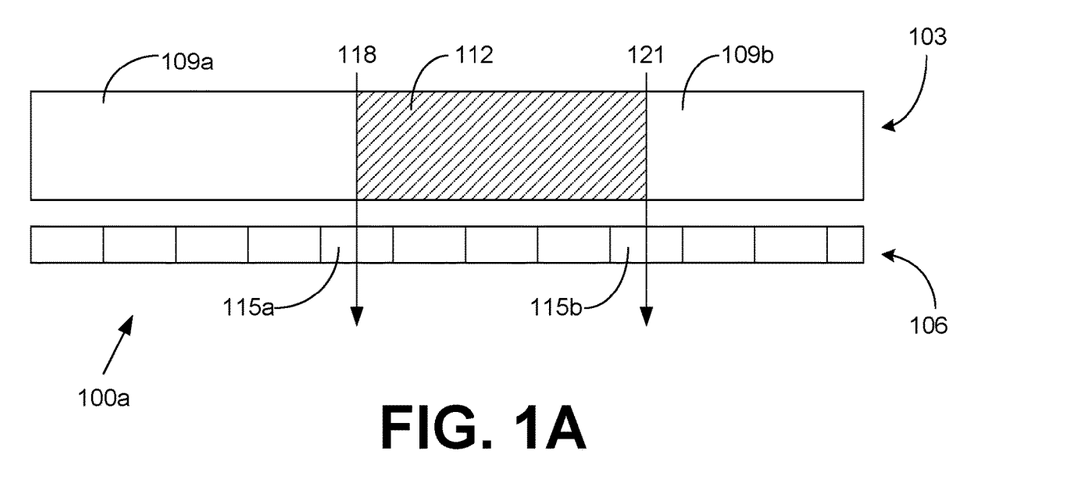
FIGS. 1A and 1B show examples of video/audio timelines according to one or more embodiments of the present disclosure.

Turning to FIG. 1A, shown is one example of a video/audio timeline 100a according to one or more embodiments of the present disclosure. The video/audio timeline 100a comprises video content 103 that are rendered in synchronization with one or more audio tracks 106. The video content 103 comprises a first unmodified portion 109a, a modified portion 112, and a second unmodified portion 109b in time sequence. The unmodified portions 109 may correspond to the video content 103 as originally produced, while the modified portion 112 may correspond to a portion modified in a post-production process, for example, to include a virtual product placement embedded within the video content 103. The audio track 106 comprises a plurality of audio frames 115, including audio frames 115a and 115b, where each audio frame comprises a duration of audio samples that are encoded using an audio coding.

In the example of FIG. 1A, a start cue point 118 is set exactly at the starting time of the modified portion 112 of the video content 103, and an end cue point 121 is set exactly at the ending time of the modified portion 112 of the video content 103. In various implementations, a video stream packages together both the video content 103 and the audio track 106. The start cue point 118 causes a media player to switch to the modified portion 112, and the end cue point 121 causes the media player to switch to the unmodified portion 109b. In this example, the start cue point 118 falls within a particular audio frame 115a, and the end cue point 121 falls within a particular audio frame 115b. If a media player playing the video stream were to switch to and from the modified portion 112 at precisely the start cue point 118 and the end cue point 121, respectively, perceptible glitches in the audio may occur.

In one or more embodiments, the media player can be explicitly directed to perform additional processing to handle the transition in a seamless matter. For example, the media player may be directed to finish playing out the audio frame 115a before switching the audio track 106 to the modified content, or to finish playing out the audio frame 115b before switching from the modified content.

Figure 1B:
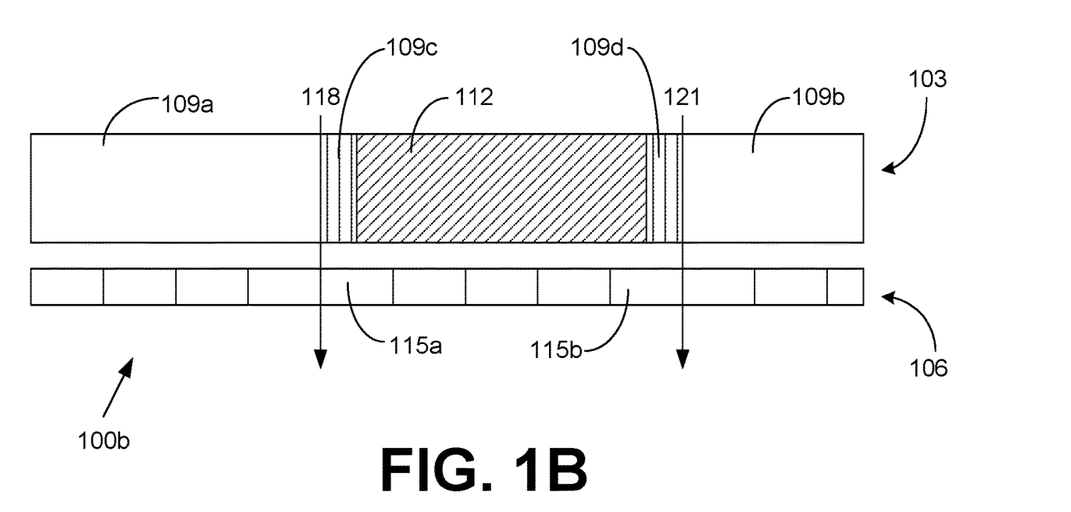

Moving to FIG. 1B, shown is another example of a video/audio timeline 100b according to one or more embodiments of the present disclosure. In order to avoid glitches, the start cue point 118 is moved earlier in time, and the end cue point 121 is moved later in time. Consequently, both the start cue point 118 and the end cue point 121 are respectively aligned with the boundaries of audio frame 115a and audio frame 115b.

By moving the start cue point 118 to an earlier position, an unmodified portion 109c of the video content 103 is added to the beginning of the modified portion 112 that includes a modification. Likewise, by moving the end cue point 121 to a later position, another unmodified portion 109d is added to the end of the modified portion 112. By aligning the audio frame boundaries with the start cue point 118 that indicates a switch to the modified portion 112 and with the end cue point 121 that indicates a switch from the modified portion 112, the glitches associated with the video/audio timeline 100a (FIG. 1A) can be avoided.

The video and audio alignment is adjusted to the earliest point and the latest point, if there are multiple audio codec formats available in audio data. For example, there might be stereo AAC (different variants might exist, AAC-LC, HE-AAC v1 and HE-AAC v2), surround sound DOLBY DIGITAL+5.1 and 3-D immersive ATMOS available for the same audio language, and the adjustments could be slightly different for different codec formats. The adjustment of video and audio may align the video boundary with all the audio boundaries across different codec formats, in the start and end.

Figure 1C:
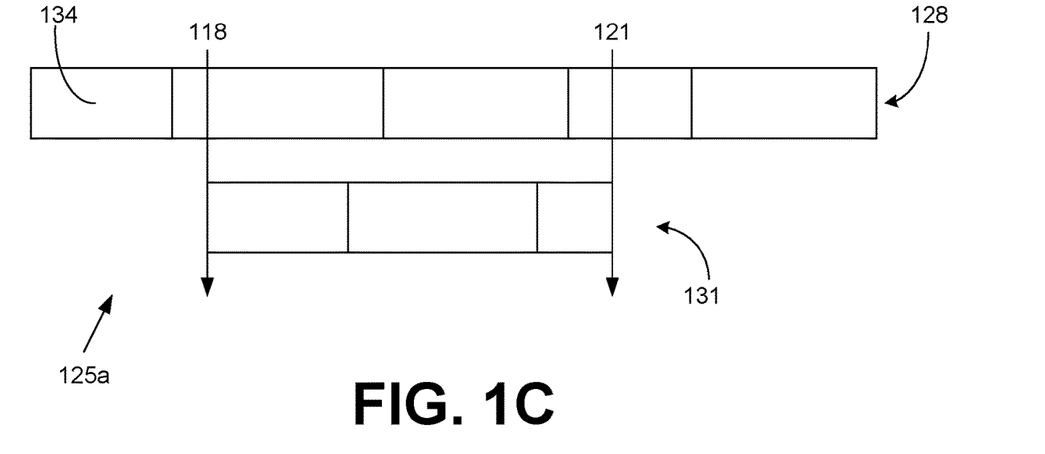
FIGS. 1C and 1D show examples of video timelines comparing unmodified video content with modified video content according to one or more embodiments of the present disclosure.

FIG. 1C shows an example video timeline 125a comparing the unmodified video content 128 with the modified video content 131. The unmodified video content 128 and the modified video content 131 each comprise a plurality of video frame groups 134. A video frame group 134 corresponds to a sequence of video frames that are coded without dependencies outside of the group. The video frame group 134 may also be called a group of pictures (GOP). The video frame group 134 begins with a key video frame, called an I-frame, and is followed by any number of video frames that are dependent on other video frames within the video frame group 134 (i.e., P-frames and B-frames).

The start cue point 118 indicates a switch from the unmodified video content 128 to the modified video content 131, and the end cue point 121 indicates a switch from the modified video content 131 to the unmodified video content 128. Because the start cue point 118 is not aligned with a boundary of a video frame group 134, switching to the modified video content 131 may cause a visual glitch. For example, the last video frame in the unmodified video content 128 before the start cue point 118 may be a B frame that depends on a next video frame. However, the unaligned switch prevents that video frame, and potentially others, from being properly rendered.

Similarly, because the end cue point 121 is not aligned with a boundary of a video frame group 134, switching back to the unmodified video content 128 may cause a visual glitch. For example, the first video frame in the unmodified video content may be a P-frame or B-frame that depends on a previous frame that is unavailable due to the switch. Subsequent P frames and B-frames may also be prevented from being properly rendered due to the unaligned switch.

In one or more embodiments, a media player may be explicitly directed to handle playback in a seamless and contiguous manner. For example, the media player may be directed to finish decoding the video frame group 134 in the unmodified video content 128 so that the last video frame before the start cue point 118 can be rendered properly. Also, the media player may be directed to begin decoding the video frame group 134 in the unmodified video content 128 early so that the first video frame after the end cue point 121 can be rendered properly.

Figure 1D:
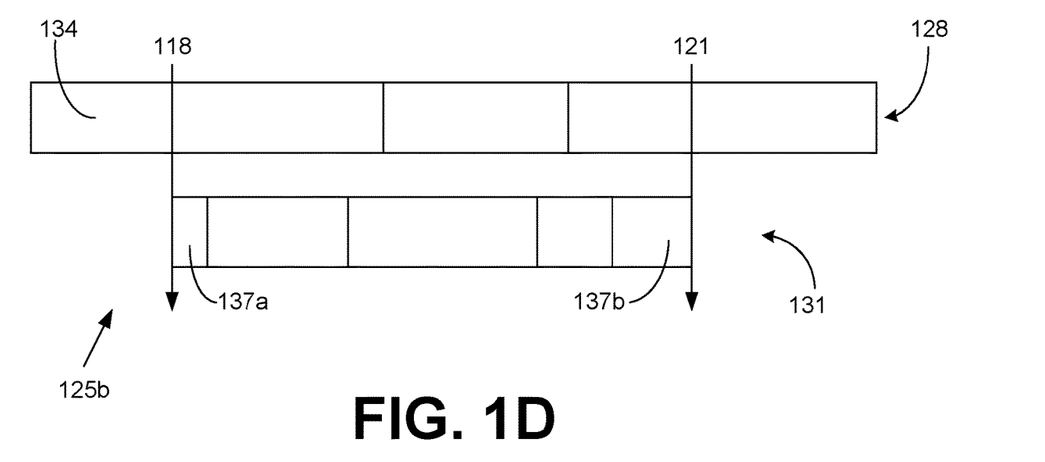

Turning now to FIG. 1D, shown is another example of a video timeline 125b comparing the unmodified video content 128 with the modified video content 131. In this example, the start cue point 118 is moved earlier in time to align with the end of a video frame group 134 in the unmodified video content 128, and the end cue point 121 is moved later in time to align with the beginning of a video frame group 134 in the unmodified video content 128. Consequently, the beginning of the modified video content 131 is padded with a portion 137a of the unmodified video content 128, and the end of the modified video content 131 is padded with a portion 137b of the unmodified video content 128. The start cue point 118 and the end cue point 121 may be set to align the modified video content 131 with the unmodified video content 128 and with the audio track 106 (FIGS. 1A & 1B). In this way, the switches occur at key video frames only, and visual decoding glitches can be avoided. In the following discussion, a general description of the system and its components is provided, followed by a discussion of the operation of the same.

Figure 2:
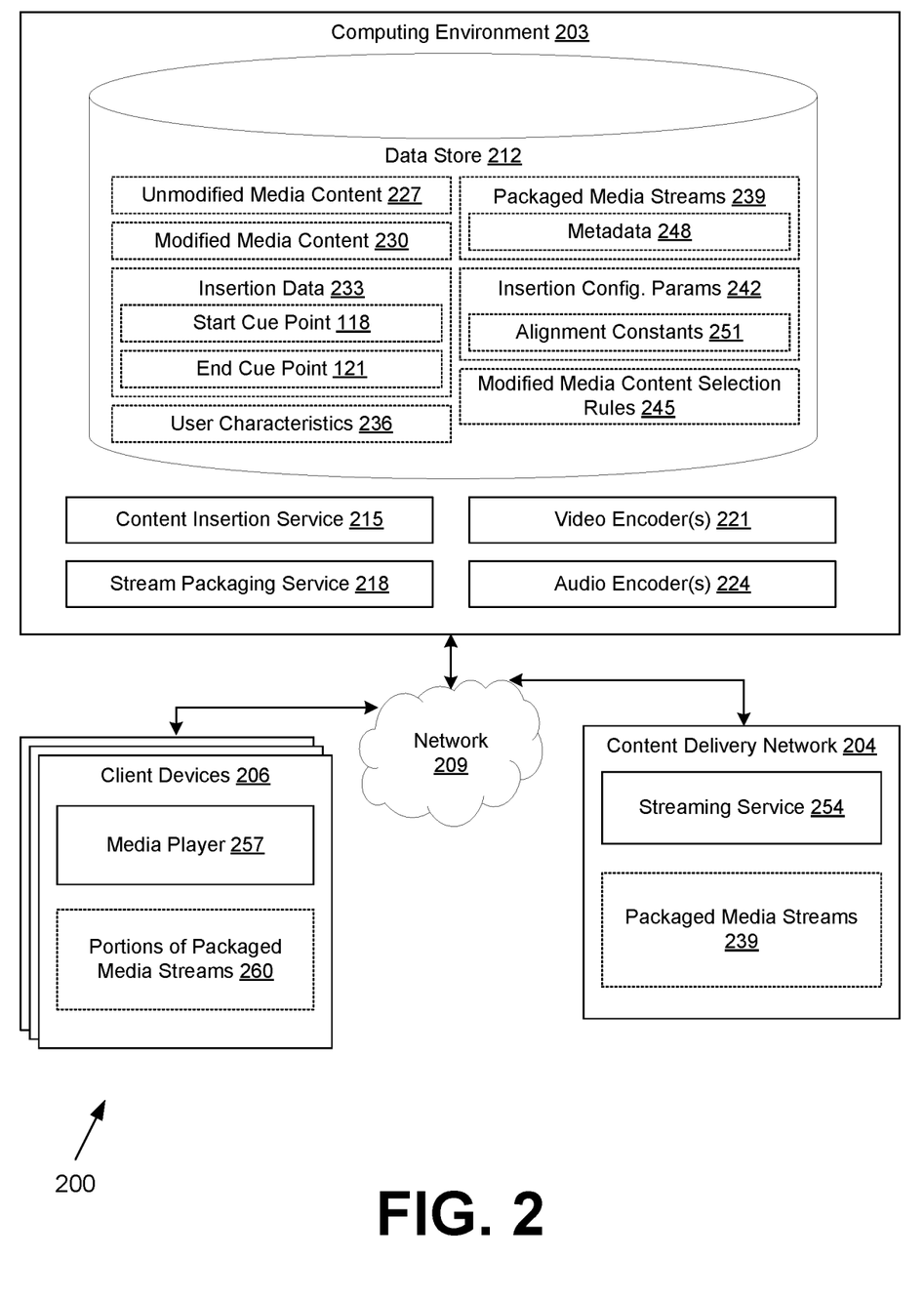
FIG. 2 is a schematic block diagram of a networked environment according to various embodiments of the present disclosure.

With reference to FIG. 2, shown is a networked environment 200 according to various embodiments. The networked environment 200 includes a computing environment 203, a content delivery network 204, and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content insertion service 215, a stream packaging service 218, one or more video encoders 221, one or more audio encoders 224, and other applications, services, processes, systems, engines, or functionality not discussed in detail herein. The content insertion service 215 is executed to insert modified portions of media content (e.g., modified video content and/or modified audio content) into original media content, thereby replacing a portion of the original media content. Through various approaches as will be described, the content insertion service 215 is able to insert this modified content in a seamless, contiguous way in order to avoid visual or aural errors or glitches. Additionally, the content insertion service 215 may select from multiple alternative versions of modified media content based upon factors such as user characteristics.

The stream packaging service 218 is executed to package media content into a media stream, such as packaging video content with one or more accompanying audio tracks into a video stream. In some embodiments, the stream packaging service 218 may perform transcoding of media content, with different video resolutions, video frame rates, video compression settings, audio compression settings, audio sample rates, audio quantization, and so on, in order to best adapt the media content to a variety of streaming situations, including low or high bandwidth network 209 connections and client devices 206 having a variety of different size displays. The stream packaging service 218 may also package media content along with alternative trick play streams (e.g., the stream at half speed or double speed), which may be separately encoded. In some embodiments, the stream packaging service 218 generates a set of thumbnail images for the video stream, for example, for display in a user interface when setting a cue point for playback.

The video encoder 221 is executed to encode video using a video coding, such as H.264 Advanced Video Coding, H.265 High Efficiency Video Coding, MPEG-1, MPEG-2, and so on. The video encoder 221 may encode uncompressed source video or may transcode from one video coding to another. The video coding may comprise a combination of parameters, such as frame rate, color depth, resolution, interlacing, compression settings, encryption and digital rights management, and so on.

The audio encoder 224 is executed to encode audio using an audio coding, such as MP3, AAC, OGG VORBIS, Free Lossless Audio Codec (FLAC), and so on. The audio encoder 224 may compress raw pulse code modulation (PCM) audio data or may transcode previously encoded audio data to another audio coding. The audio coding may comprise a combination of parameters, such as sample rate, quantization, stereo or mono, compression parameters, encryption and digital rights management, and so on.

The data stored in the data store 212 includes, for example, unmodified media content 227, modified media content 230, insertion data 233, one or more user characteristics 236, one or more packaged media streams 239, one or more insertion configuration parameters 242, one or more modified media content selection rules 245, and potentially other data. The unmodified media content 227 may include content such as movies, television programs, documentaries, sporting events, and other forms of video and/or audio media content. The unmodified media content 227 may correspond to uncompressed source material or may already be encoded using a video coding and/or an audio coding. The unmodified media content 227 may be supplied by a studio, producer, or another originating party. The unmodified media content 227 may also include closed captioning data, alternative audio tracks for commentaries or other languages, thumbnail images, and/or other data.

The modified media content 230 corresponds to a portion of the unmodified media content 227 that has been modified in some way. For example, the video of the unmodified media content 227 may be digitally edited to superimpose a virtual product placement. This may take the form of inserting a dish of branded candies onto a conference table, inserting a branded soft drink can on the conference table, inserting a branded consumer device on the conference table, replacing the content of a billboard shown in the video, or other types of modifications. In some cases, the modification may be to the audio track, such as inserting dialogue, replacing dialogue, inserting a sound associated with a product, inserting background music, and other forms of modification. The modification may also affect the closed captioning data for the video, e.g., due to a change in dialogue resulting from the modification, and the modified media content 230 may include modified closed captioning data. Potentially multiple audio tracks, including commentaries and dialogue in other languages, may be affected by the modification, and the modified media content 230 may include changes to multiple audio tracks in some cases.

The modified media content 230 typically has a duration corresponding to the length of the modification, such as the frames that are digitally edited. For example, when digitally inserting a product on a conference table, the length of the modified media content 230 may correspond to the length of the scene in which the conference table is visible. In other examples, the modified media content 230 is edited for sanitization, e.g., to remove objectionable language, obscure explicit scenes, and so on.

The insertion data 233 configures the insertion of the modified media content 230 into the unmodified media content 227 in a seamless and contiguous manner. In some embodiments, the insertion data 233 may include a start cue point 118, an end cue point 121, and other data regarding the insertion. It is noted that the start cue point 118 may precede the start time of the actually modified media content 230, and the end cue point 121 may follow the end time of the actually modified media content 230. These points may be dynamically adjusted in order to align the modified media content 230 with the encoding of the unmodified media content 227.

The user characteristics 236 may store characteristics of users who consume the media content. Such user characteristics 236 may include browsing history, viewing history, listening history, purchase history, user demographics, user location, and other characteristics that are known of the user. the user characteristics 236 may be a factor in selecting a particular modified media content 230 from a plurality of alternative versions of the modified media content 230.

The packaged media streams 239 may correspond to media streams (e.g., video streams) that are prepared for delivery to client devices 206 by way of a content delivery network 204. The packaged media streams 239 may include modified media content 230 that is inserted to replace content from the unmodified media content 227. The packaged media streams 239 may be encoded using a number of different coding formats. For example, the packaged media streams 239 may be packaged for use using a streaming protocol such as DASH, HLS, or another protocol. The packaged media streams 239 may include metadata 248 such as, for example, manifests that define various chunks of content and how they are handled. In various implementations, the packaged media streams 239 may include thumbnail images corresponding to the video as well as trick play streams (e.g., content transcoded at double speed or half speed).

The insertion configuration parameters 242 control the insertion of the modified media content 230 into the unmodified media content 227 to form the packaged media streams 239. For example, the insertion configuration parameters 242 may define one or more alignment constants 251 that are used to calculate the state cue point 118 and/or the end cue point 121 based upon key frame locations and/or audio frame boundaries. The insertion configuration parameters 242 may also configure replacement of closed captioning data, replacement of thumbnail images, generation of trick play streams, and so forth.

The modified media content selection rules 245 control the selection of particular items of modified media content 230 for insertion into the unmodified media content 227. The insertion may be based at least in part on one or more of the user characteristics 236 for a user associated with a particular client device 206 that is consuming media content. For example, the modified media content selection rules 245 may indicate that a product placement that has been used previously should not be used again because the user has already seen it, that a particular product placement should be used because the user is likely to buy similar products according to the purchase history of the user, that a particular product placement should be used because of the user's demographics or location, and other selection strategies.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, digital projectors, smartwatches, head mounted displays, voice interface devices, or other devices. The client device 206 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The content delivery network 204 may correspond to any number of servers at one or more locations (e.g., data centers in a cloud provider network) that are configured for serving up media content to client devices 206 by way of the network 209. The content delivery network 204 may be configured to cache a number of packaged media streams 239 at edge locations or various data centers to ensure high quality network delivery of the packaged media streams 239 to the client devices 206. The content delivery network 204 may include one or more streaming services 254 that serve the packaged media streams 239 to the client devices 206 by way of HLS, DASH, Real Time Streaming Protocol (RTSP), and/or other protocols.

The client device 206 may be configured to execute various applications such as a media player 257 and/or other applications. The media player 257 may be executed to request media content from a streaming service 254 of a content delivery network 204, and to receive the media content from the streaming service 254. Once portions of packaged media streams 260 are received, the media player 257 decodes the portions of the packaged media streams 260 and renders them for display and audio playback. In this regard, the media player 257 may handle digital rights management, including decrypting the portions of the packaged media streams 260 and ensuring that the decrypted portions are not accessed in an unauthorized manner.

In some embodiments, the media player 257 may be configured to handle discontinuities of media content, such as insertions of modified portions of media content, in a seamless manner in response to directives sent by the streaming service 254 as will be described. The media player 257 may be configured to access a number of different streaming services 254, for example, that may correspond to different Video on Demand (VoD) subscriptions. The client device 206 may be configured to execute applications beyond the media player 257, such as, for example, email applications, social networking applications, word processors, spreadsheets, and/or other applications.

Figure 3:
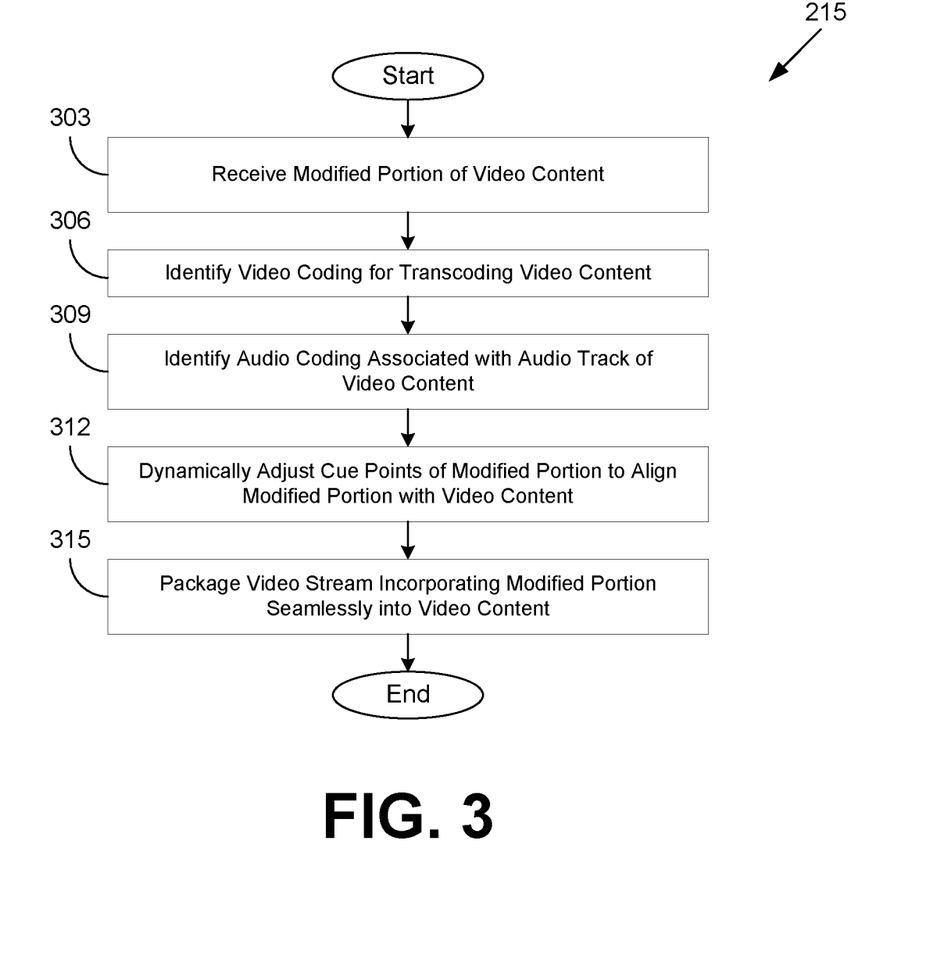
FIG. 3 is a flowchart illustrating one example of functionality implemented as portions of a content insertion service executed in a computing environment in the networked environment of FIG. 2 according to various embodiments of the present disclosure.

Referring next to FIG. 3, shown is a flowchart that provides one example of the operation of a portion of the content insertion service 215 according to various embodiments. It is understood that the flowchart of FIG. 3 provides merely an example of the many different types of functional arrangements that may be employed to implement the operation of the portion of the content insertion service 215 as described herein. As an alternative, the flowchart of FIG. 3 may be viewed as depicting an example of elements of a method implemented in the computing environment 203 (FIG. 2) according to one or more embodiments.

Beginning with box 303, the content insertion service 215 receives a modified portion of video content. In this regard, the video content corresponds to unmodified media content 227 (FIG. 2), and the modified portion corresponds to modified media content 230 (FIG. 2). The modified portion may be created via a post-production process to insert a virtual product placement into the video and/or an accompanying audio track. For example, the virtual product placement may include a product logo or an image of a branded product that is digitally inserted over a portion of the video content. In some cases, the modified portion may correspond to an alternate version of the media content supplied by the producer of the media content. For example, a scene containing a conference table may be recorded multiple times with different objects corresponding to product placements on the conference table.

The modifications may also include modifications of a corresponding audio track of the video content. For example, different dialogue mentioning a product may be generated, or a distinctive sound associated with a product may be generated. In some cases, the modification is only to the video content, and the original, unmodified audio track is used in conjunction with the modified portion of the video content. The modifications may also impact closed captioning data, thumbnail images of the video content, trick play streams, and so forth.

The modified portion of the content may be defined relative to a modification in the modified portion relative to the original and unmodified media content 227, as specified in the insertion data 233 (FIG. 2). For example, a start cue point 118 (FIG. 2) may be defined relative to the beginning of the modification, and the end cue point 121 (FIG. 2) may be defined relative to the end of the modification. Video content, such as a movie or television program, may have a plurality of modified portions of video content to replace the same unmodified portion or to replace a plurality of unmodified portions of the video content. The modified portion of video content may be downloaded from a service or may be manually created and then stored in the data store 212 (FIG. 2).

In box 306, the content insertion service 215 identifies a particular video coding used or to be used in transcoding the video content. In various scenarios, the video content may be transcoded using a plurality of video codings to generate video streams at different resolutions, different frame rates, and different bitrates for client devices 206 having different capabilities and constraints regarding connections to the network 209. As one example, a transcoding using a video coding suitable for ultra-high resolution (e.g., 4K) may be used for streaming the video content to a large-size digital television having a fiber broadband connection. As another example, a transcoding using a video coding suitable for ultra-low resolution may be used for streaming the video content to a smartphone on a data-capped cellular data connection.

In box 309, the content insertion service 215 identifies an audio coding associated with an audio track of the video content. For example, the audio coding may be associated with a sample rate, a quantization, a compression level, a frame size, and/or other parameters. In some cases, the audio coding may be changed in a transcoding process, or the original audio coding may be preserved when generating a media stream.

In box 312, the content insertion service 215 dynamically adjusts one or more of the start cue point 118 and/or the end cue point 121 to align the modified portion with the unmodified portion of the video content. The adjustment may be based at least in part on the video coding and/or the audio coding. For example, the start cue point 118 may be moved earlier in time so that the modified portion includes a first unmodified portion of the video content at the beginning of the modified portion, and/or the end cue point 121 may be moved later in time so that the modified portion includes a second unmodified portion of the video content at the end of the modified portion. The alignment may be to align the start cue point 118 and/or the end cue point 121 with an audio frame boundary for an audio track of the video content. The alignment may also be to align the start cue point 118 and/or the end cue point 121 with a key video frame.

In one scenario, the modified portion of the video content as stored as the modified media content 230 includes unmodified portions before and after the modification. In such a scenario, the start cue point 118 and the end cue point 121 may simply be adjusted to include unmodified portions before and/or after the modification for alignment purposes. In another scenario, the modified media content 230 may be edited by the content insertion service 215 to include the unmodified portions copied from the unmodified media content 227 before and/or after the modification.

The alignment of the modified portion with respect to the unmodified media content 227 for insertion purposes may be controlled based at least in part on insertion configuration parameters 242 (FIG. 2), such as the alignment constants 251 (FIG. 2). For example, a constant multiplier of time may be determined based at least in part on the video coding and the audio coding used to encode an audio track of the video content, and the key video frames and/or audio frame boundaries used in the alignment may be determined by the constant multiplier of time.

In specific non-limiting examples, an integer video frame rate (e.g., 30 video frames per second) may result in setting the respective cue points at a time location of eight seconds multiplication for the Advanced Audio Coding-Low Complexity (AAC-LC) audio coding, sixteen seconds multiplication for the High-Efficiency Advanced Audio Coding (HE-AAC) audio coding, and four seconds multiplication for the DOLBY DIGITAL PLUS/ATMOS coding. A non-integer video frame rate (e.g., 30000/1001 video frames per second) may result in setting the respective cue points at a time location of 64.064 seconds multiplication for the AAC-LC audio coding, 128.128 seconds multiplication for the HE-AAC audio coding, and 32.032 seconds multiplication for the DOLBY DIGITAL PLUS/ATMOS coding.

In box 315, the content insertion service 215 causes the stream packaging service 218 (FIG. 2) to package a video stream incorporating the modified portion seamlessly into the video content, with the switch to and from the modified portion occurring at the start cue point 118 and the end cue point 121 as specified in the insertion data 233. In various implementations, the same encoding profile may be used for encoding the modified portions as is used in encoding the unmodified portions of the video content. It is noted that the packaged media streams 239 may be generated with thumbnail images modified according to the modification, trick play streams modified according to the modification, closed captioning data modified according to the modification, alternative audio tracks modified according to the modification, and so forth. Subsequently, the generated packaged media streams 239 (FIG. 2) may be transferred via the network 209 (FIG. 2) to the content delivery network 204 (FIG. 2) for distribution to client devices 206 (FIG. 2). Thereafter, the operation of the portion of the content insertion service 215 ends.

Figure 4:
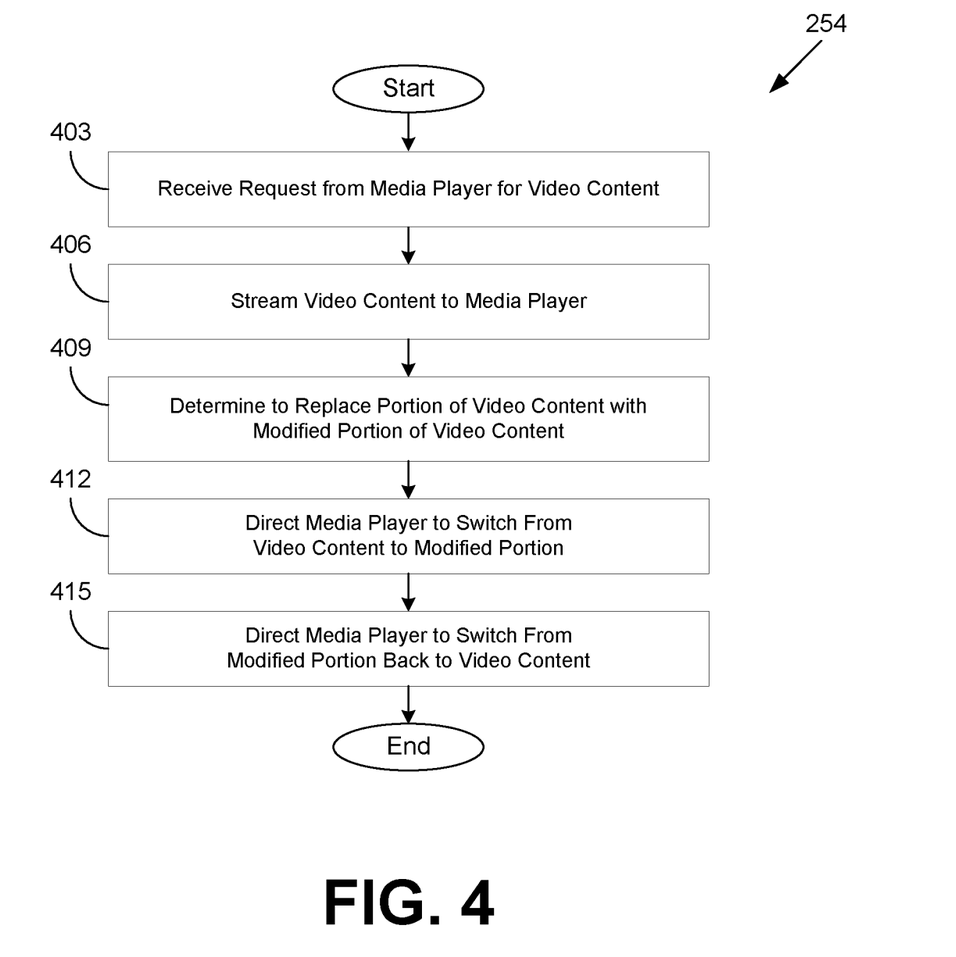
FIGS. 4 and 5 are flowcharts illustrating examples of functionality implemented as portions of a streaming service executed in a computing environment or a content delivery network in the networked environment of FIG. 2 according to various embodiments of the present disclosure.

Turning now to FIG. 4, shown is a flowchart that provides one example of the operation of a portion of the streaming service 254 according to various embodiments. It is understood that the flowchart of FIG. 4 provides merely an example of the many different types of functional arrangements that may be employed to implement the operation of the portion of the streaming service 254 as described herein. As an alternative, the flowchart of FIG. 4 may be viewed as depicting an example of elements of a method implemented in the computing environment 203 (FIG. 2) or the content delivery network 204 (FIG. 2) according to one or more embodiments.

Beginning with box 403, the streaming service 254 receives a request for video content from a media player 257 (FIG. 2) executed on a client device 206 (FIG. 2). For example, a user may browse a list of titles available for streaming and may select a particular movie or television program for streaming. This selection causes a request to be sent from the media player 257 to the streaming service 254 in the content delivery network 204. In some cases, the request may be sent automatically, such as when the media player 257 automatically begins playing a next title in a sequence of titles.

In box 406, the streaming service 254 began streaming the video content to the media player 257 over the network 209. The video content may be streamed from one of the packaged media streams 239 (FIG. 2) already present or cached in the content delivery network 204, or the packaged media stream 239 may be downloaded to the content delivery network 204 in the background from the computing environment 203 responsive to the request. Before streaming the video content to the media player 257, the streaming service 254 may verify that the media player 257 has access under a subscription, a purchase, or otherwise according to digital rights management.

In box 409, the streaming service 254 determines to replace a portion of the video content with a modified portion of the video content. For example, a portion of the video content may be replaced in order to insert a virtual product placement. The modified portion being inserted may be the same length as the unmodified portion being replaced. The modified portion of the video content may be selected from a plurality of alternative versions of the modified portion of the video content. The replacement may be made according to the insertion data 233 (FIG. 2), specifying a start cue point 118 (FIG. 2) and an end cue point 121 (FIG. 2).

In box 412, the streaming service 254 directs the media player 257 to switch seamlessly from the video content to the modified portion of the video content while handling an audio track misalignment. The audio track misalignment may correspond to switching the audio track to the audio track of the modified portion of the video content at a cue point that is not at an audio frame boundary. The audio track misalignment may be handled by the media player 257, for example, by fading out one audio track into another, filling gaps, and so on. The modified portion may be encrypted with the same encryption keys as the unmodified video content. Without sending this directive, the switch to the modified portion of the video content may result in a video glitch or an audio glitch that may be perceptible to the user. In some cases, this directive may be contained within metadata 248 (FIG. 2) sent along with the packaged media stream 239 to the media player 257. For example, the directive to play the modified portion seamlessly and contiguously may be a tag in an HLS manifest associated with the modified portion (e.g., a discontinuity tag). Alternatively, the directive may take the form of a period insertion according to DASH, where the period insertion causes the modified portion to be played seamlessly and contiguously. In order to play the modified portion seamlessly and contiguously, the media player 257 may be equipped with features to handle alignment along key video frames, including decoding content that will not be played so that frames before the switch will be rendered accurately. Alternatively, in some implementations, it may be assumed that the media player 257 will only switch the video at key frames, and the video content may be encoded with one or more additional key frames to handle the switch. Similarly, the media player 257 may be configured to handle a switch to the modified portion with respect to the audio track, even if the audio track is switched in between an audio frame boundary.

In box 415, the streaming service 254 directs the media player 257 to switch seamlessly from the modified portion of the video content back to the video content while handling an audio track misalignment. The audio track misalignment may correspond to switching the audio track to the audio track of the unmodified portion of the video content at a cue point that is not at an audio frame boundary. The audio track misalignment may be handled by the media player 257, for example, by fading out one audio track into another, filling gaps, and so on. Without sending this directive, the switch to back to the unmodified video content may result in a video glitch or an audio glitch that may be perceptible to the user. In some cases, this directive may be contained within metadata 248 sent along with the packaged media stream 239 to the media player 257. For example, the directive to return to the unmodified video content seamlessly and contiguously may be a tag in an HLS manifest (e.g., a discontinuity tag). Alternatively, the directive may take the form of a period insertion according to DASH, where the period insertion causes the return to the unmodified video content to be played seamlessly and contiguously. In order to return to the unmodified video content seamlessly and contiguously, the media player 257 may be equipped with features to handle alignment along key video frames, including decoding content that will not be played so that frames after the switch will be rendered accurately. Alternatively, in some implementations, it may be assumed that the media player 257 will only switch the video at key frames, and the video content may be encoded with one or more additional key frames to handle the switch. Similarly, the media player 257 may be configured to handle a switch to the unmodified video content with respect to the audio track, even if the audio track is switched in between an audio frame boundary. Thereafter, the operation of the portion of the streaming service 254 ends.

Figure 5:
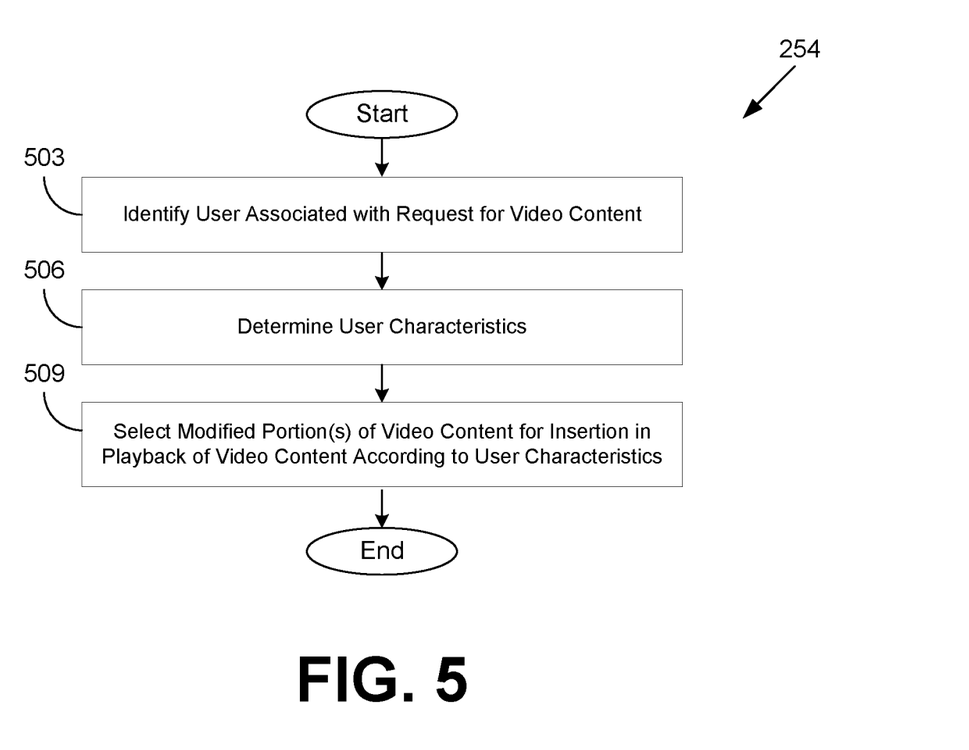

Moving on to FIG. 5, shown is a flowchart that provides one example of the operation of a portion of the streaming service 254 according to various embodiments. It is understood that the flowchart of FIG. 5 provides merely an example of the many different types of functional arrangements that may be employed to implement the operation of the portion of the streaming service 254 as described herein. As an alternative, the flowchart of FIG. 5 may be viewed as depicting an example of elements of a method implemented in the computing environment 203 (FIG. 2) or the content delivery network 204 (FIG. 2) according to one or more embodiments.

Beginning with box 503, the streaming service 254 identifies a user or account associated with a request for consuming video content. For example, a request for video content may be originated from a media player 257 (FIG. 2) that is signed into the streaming service 254 and authenticated under a particular user account. In some embodiments, the media player 257 may be configured to verify via a user interface which of several user profiles is applicable to the current user.

In box 506, the streaming service 254 determines user characteristics 236 (FIG. 2) that are associated with the identified user or account. The user characteristics 236 may include, for example, user demographic data, purchase history data, browse history data, viewing history data, explicitly configured user preferences, and other characteristic information.

In box 509, the streaming service 254 selects one or more modified portions of the video content that is requested for insertion in playback of the video content based at least in part on one or more of the user characteristics 236. The modified portions that are selected may be selected as a best fit according to the user characteristics 236. In some cases, the selection of a particular modified portion of the video content may be made irrespective of the user characteristics 236. For example, it may be the case that a streaming service 254 always inserts a certain modified portion to replace a particular portion in the video content (e.g., to replace offensive language, remove explicit scenes, etc.).

In some embodiments, a packaged video stream 239 already containing the inserted modified content and generated according to the flowchart of FIG. 3 may be sent to the media player 257. In such embodiments, the media player 257 need not have support for any particular method of seamless and contiguous playback. Alternatively, the media player 257 may be directed to implement the playback of the modified content according to specific support for seamless and contiguous playback in the media player 257, according to the flowchart of FIG. 4. Thereafter, the operation of the portion of the streaming service 254 ends.

Figure 6:
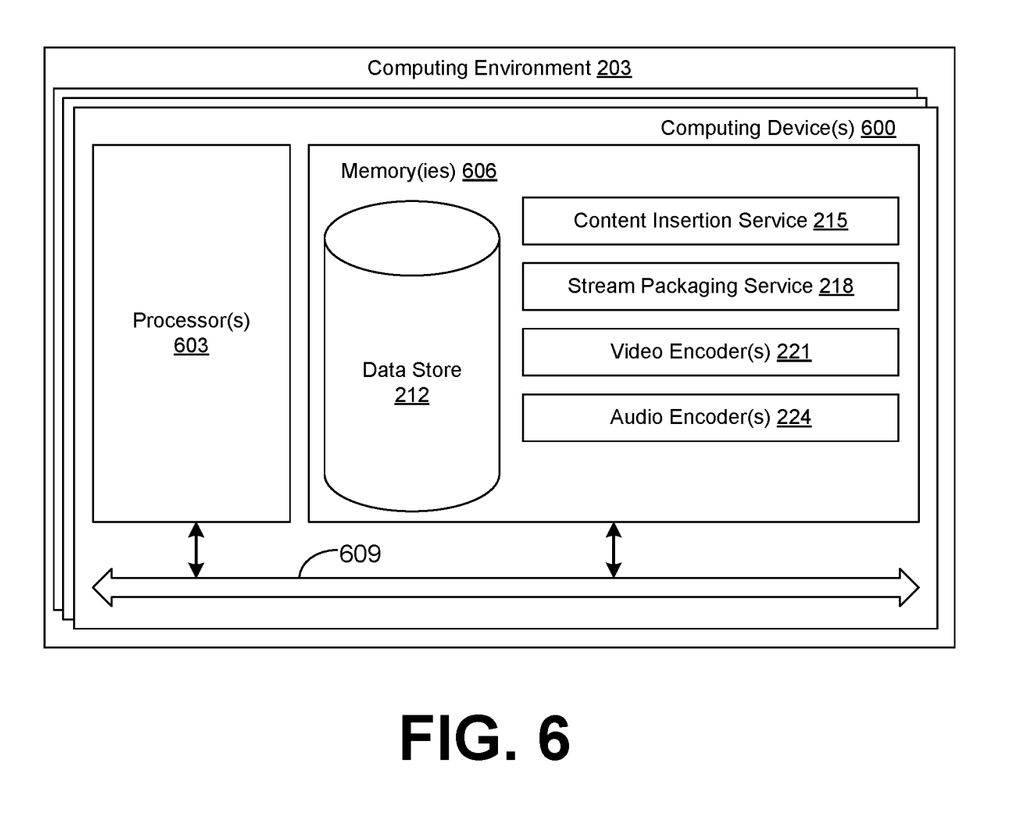
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the content insertion service 215, the stream packaging service 218, the video encoders 221, the audio encoders 224, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the content insertion service 215, the stream packaging service 218, the video encoders 221, the audio encoders 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the content insertion service 215 and the streaming service 254 (FIG. 2). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content insertion service 215, the stream packaging service 218, the video encoders 221, and the audio encoders 224, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content insertion service 215, the stream packaging service 218, the video encoders 221, and the audio encoders 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
instructions executable in the at least one computing device, wherein when executed the instructions cause the at least one computing device to at least:
receive a modified portion of video content, the modified portion having a start cue point and an end cue point that are set relative to a modification to the video content to indicate respectively when the modification approximately begins and ends compared to the video content;
identify a video coding used in transcoding the video content;
identify an audio coding associated with an audio track of the video content;
dynamically adjust at least one of the start cue point or the end cue point to align the modified portion with the video content based at least in part on the video coding and the audio coding, thereby expanding the modified portion to include at least one of: a first unmodified portion of the video content at a beginning of the modified portion or a second unmodified portion of the video content at an end of the modified portion; and
package a video stream incorporating the modified portion seamlessly into the video content between the start cue point and the end cue point, the modified portion replacing an unmodified portion of the video content between the start cue point and the end cue point such that the unmodified portion of the video content is removed from the video stream.

2. The system of claim 1, wherein the modification corresponds to a virtual product placement in the modified portion.

3. The system of claim 1, wherein the modification includes modified closed captioning data pertaining to the modified portion, and the video stream includes the modified closed captioning data for the modified portion.

4. The system of claim 1, wherein the video stream includes one or more modified thumbnail images for the modified portion.

5. The system of claim 1, wherein the instructions further cause the at least one computing device to at least select the modified portion from a plurality of alternative versions of the modified portion based at least in part on one or more user characteristics.

6. The system of claim 1, wherein the start cue point is adjusted to align with a first key video frame in the modified portion, and the end cue point is adjusted to align with a second key video frame in the video content.

7. The system of claim 1, wherein at least one of the start cue point or the end cue point is adjusted to align with an audio frame boundary for the audio track of the video content.

8. The system of claim 1, wherein at least one of the start cue point or the end cue point are adjusted to align with a key video frame at a time location determined by a constant multiplier of time, the constant multiplier of time being determined based at least in part on the video coding and the audio coding.

9. A computer-implemented method, comprising:
receiving a modified portion of video content, the modified portion having a start cue point and an end cue point that are set relative to a modification to the video content to indicate respectively when the modification approximately begins and ends compared to the video content;
identifying a video coding associated with the video content;
dynamically adjusting at least one of the start cue point or the end cue point to align the modified portion with the video content based at least in part on the video coding, which further comprises at least one of:
dynamically adjusting the start cue point to be earlier in time so that the modified portion includes a first unmodified portion before the modification; or
dynamically adjusting the end cue point to be later in time so that the modified portion includes a second unmodified portion after the modification; and
replacing an unmodified portion of the video content with the modified portion such that the unmodified portion of the video content is removed from the video content.

10. The computer-implemented method of claim 9, further comprising packaging a video stream incorporating the modified portion seamlessly into the video content between the start cue point and the end cue point.

11. The computer-implemented method of claim 9, further comprising transcoding the video content and the modified portion using a plurality of video codings.

12. The computer-implemented method of claim 9, wherein dynamically adjusting the at least one of the start cue point or the end cue point to align the modified portion with the video content based at least in part on the video coding further comprises aligning the at least one of the start cue point or the end cue point with a key video frame.

13. The computer-implemented method of claim 9, wherein dynamically adjusting the at least one of the start cue point or the end cue point to align the modified portion with the video content based at least in part on the video coding further comprises aligning the at least one of the start cue point or the end cue point with an audio frame boundary for an audio track of the video content.

14. The computer-implemented method of claim 9, further comprising:
determining a constant multiplier of time based at least in part on the video coding and an audio coding used to encode an audio track of the video content; and
wherein dynamically adjusting the at least one of the start cue point or the end cue point to align the modified portion with the video content further comprises aligning the at least one of the start cue point or the end cue point with a key video frame at a time location determined by the constant multiplier of time.

15. The computer-implemented method of claim 9, further comprising:
identifying an audio coding associated with an audio track of the video content; and
dynamically adjusting the at least one of the start cue point or the end cue point to align an audio track of the modified portion with the audio track of the video content based at least in part on the audio coding.

16. A computer-implemented method, comprising:
streaming video content to a media player;

determining to replace a portion of the video content with a modified portion of the video content, the modified portion having a start cue point and an end cue point that are set relative to a modification to the video content to indicate respectively when the modification approximately begins and ends compared to the video content;

directing the media player to switch from the video content to the modified portion of the video content and from the modified portion of the video content back to the video content while handling an audio track misalignment, the modified portion replacing an unmodified portion of the video content such that the unmodified portion of the video content is removed from a playback of the video content by the media player; and at least one of:

dynamically adjusting the start cue point of the modified portion to be earlier in time so that the modified portion includes a first unmodified portion before the modification; or dynamically adjusting the end cue point to be later in time so that the modified portion includes a second unmodified portion after the modification.

17. The computer-implemented method of claim 16, further comprising selecting the modified portion of the video content from a plurality of alternative versions of the modified portion based at least in part on one or more user characteristics associated with the media player.

18. The computer-implemented method of claim 16, wherein directing the media player further comprises sending at least one tag to the media player specifying seamless contiguous playback from a first period to a second period.

19. The computer-implemented method of claim 16, wherein directing the media player further comprises generating a manifest that specifies seamless contiguous playback using at least one discontinuity tag.

20. The computer-implemented method of claim 16, further comprising:

determining a constant multiplier of time based at least in part on an audio coding used to encode an audio track of the video content; and aligning the at least one of the start cue point or the end cue point with a key video frame at a time location determined by the constant multiplier of time.

\* \* \* \* \*